United States Patent [19]

Strobl

[11] Patent Number: 5,360,274
[45] Date of Patent: Nov. 1, 1994

[54] SELF-ALIGNING BEARING

[75] Inventor: Georg Strobl, Stuttgart, Germany

[73] Assignee: Johnson Electric S.A., Switzerland

[21] Appl. No.: 975,502

[22] Filed: Nov. 12, 1992

[30] Foreign Application Priority Data

Nov. 12, 1991 [GB] United Kingdom ............... 9124030

[51] Int. Cl.$^5$ ............................................. F16C 23/08
[52] U.S. Cl. ................................... 384/192; 384/205; 384/206
[58] Field of Search ............... 389/192, 203, 204, 206; 310/90; 403/122, 124, 135

[56] References Cited

U.S. PATENT DOCUMENTS

| 4,504,754 | 3/1985 | Stone | 310/90 |
| 4,626,726 | 12/1986 | King et al. | 384/215 X |
| 4,641,979 | 2/1987 | Stone | 384/146 |
| 4,806,025 | 2/1989 | Kamiyawa et al. | 384/202 |
| 4,887,916 | 12/1989 | Adam et al. | 384/192 |
| 4,924,127 | 5/1990 | Boireau et al. | 310/90 |

FOREIGN PATENT DOCUMENTS

| 965759 | 4/1948 | France . | |
| 3332323 | 3/1985 | Germany | 384/192 |
| 2060091 | 4/1981 | United Kingdom | 384/192 |
| 2201736 | 9/1988 | United Kingdom | 384/192 |

Primary Examiner—Daniel P. Stodola
Assistant Examiner—John P. Darling
Attorney, Agent, or Firm—Ostrolenk, Faber, Gerb & Soffen

[57] ABSTRACT

A self-aligning bearing for a 0.5 kW PMDC electric motor has a bearing member having a cylindrical inner surface for receiving a rotatable shaft and an outer surface comprising a first external, part-spherical, surface-of-revolution and a second external surface-of-revolution comprising a first part extending inwardly from the first external, part-spherical, surface-of-revolution and a cylindrical second part extending from the first part. A housing has a convergent end defining an internal surface of revolution which engages the first external, part-spherical, surface-of-revolution and encloses a retainer engaging the first part of the second external surface-of-revolution. The housing also encloses a support ring which holds the retainer in place and has a radially inner part which surrounds the second part of the second external surface-of-revolution with a clearance space. The support ring thereby limits tilting movement of the bearing member about axes perpendicular to the axis of the bearing member.

11 Claims, 3 Drawing Sheets

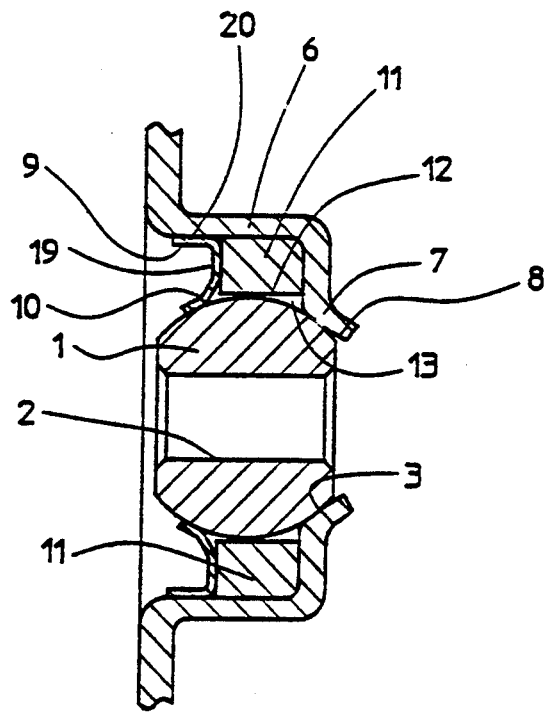
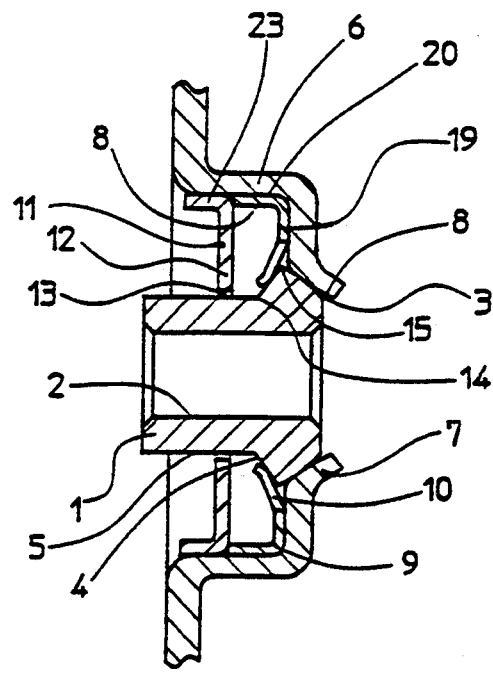
FIG.1 PRIOR ART FIG.2
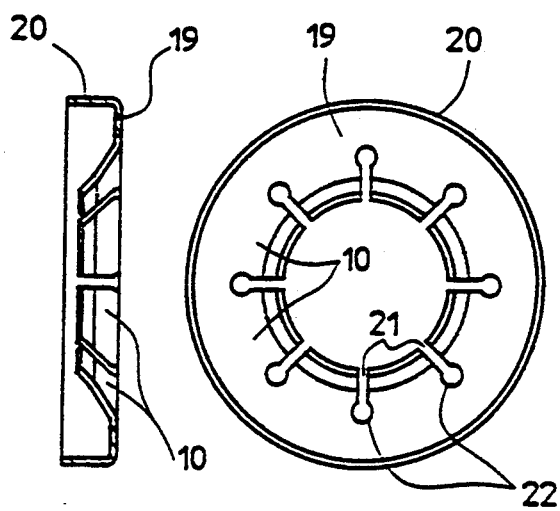
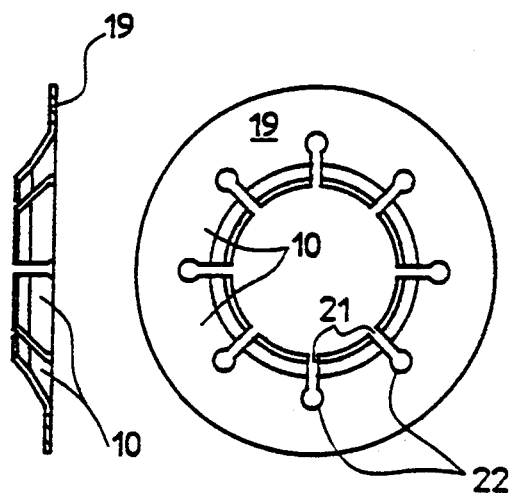
FIG.3 FIG.4 FIG.5 FIG.6

SELF-ALIGNING BEARING

FILED OF THE INVENTION

The invention relates to self-aligning bearings and in particular, although not exclusively, to self-aligning bearings for small electric motors of up to 0.5 kW capacity.

BACKGROUND ART

To accommodate imperfections in the manufacture of small electric motors, at least one of the two shaft bearings is normally a self-aligning bearing. This ensures that the rotor can rotate freely even when the two bearings are not co-axially aligned.

A self-aligning bearing such as this normally comprises a bearing member, a housing enclosing the bearing member and a resilient retainer which holds the bearing member in the housing while, at the same time, allowing the bearing member to tilt or swivel within the housing. The bearing member has a cylindrical inner surface, for receiving a rotatable shaft, and a single part-spherical surface-of-revolution forming the whole of the outer surface of the bearing member. Opposite ends of this outer surface are supported by a convergent end of the housing and by the resilient retainer.

Radial loading on the bearing members of self-aligning bearings for larger electric motors may be adequately supported by the convergent end of the housing and by a relatively robust resilient retainer. Moreover, axial clearances can be limited to such an extent that axial movement and, therefore, simultaneous radial movement are sufficiently restricted to prevent overstraining of the retainer. However, in self-aligning bearings for smaller electric motors, the retainers are much more flimsy and, although axial clearances can be somewhat reduced, they permit much greater movement relative to the size of the components and it is much more likely that the retainers will be damaged in such a way as to be incapable of the holding the bearing member in place. Small electric motors of up to 0.5 kW capacity, which can be handled manually, are particularly prone to this type of damage because they can be easily dropped in such a way as to be subjected to shock loading. It is therefore necessary to limit radial movement of the bearing member.

This can be done by providing the housing with a part-spherical seat which engages the part-spherical surface-of-revolution on the outer surface of the bearing member and which contains a circular region which defines a plane, perpendicular to the axis of the housing, which contains the centre of curvature of the part-spherical seat. However, formation of a part-spherical seat is relatively costly and this solution precludes the use of a simple frusto-conical seat. It is therefore more usual to provide a support ring which is supported within the housing and has an inner portion surrounding the bearing member with an annular clearance space between the support ring and the bearing member for limiting radial movement of the bearing member.

It is therefore known to provide a self-aligning bearing such as this in which a bearing member has an inner surface, for receiving a rotatable shaft, and an outer surface comprising a first external, part-spherical, surface-of-revolution, formed around the axis of the bearing member; a housing for accommodating the bearing member has a convergent end defining an internal surface-of-revolution engaging the first external, part-spherical, surface-of-revolution to provide the bearing member with both radial and axial support; a retainer is supported within the housing and has resilient means engaging the bearing member so as to urge the first external, part-spherical, surface-of-revolution axially into engagement with the convergent end of the housing; and a support ring has a radially inner portion surrounding the bearing member with an annular clearance space between the support ring and the bearing member for limiting radial movement of the bearing member.

A self-aligning bearing of this construction permits the bearing member, or any shaft supported within the bearing member, to be tilted or swivelled extensively, for example: through an angle of 30°, about an axis perpendicular to the axis of the bearing member. However, in use, it is only necessary for the bearing member to be capable of the tilting or swivelling through an angle of the order of 1°. Moreover, there are situations in which it is disadvantageous if the bearing member is capable of tilting or swivelling movement permitted by known designs. Thus, in the assembly of small electric motors, particularly by automated processes, difficulty is encountered when the bearing member is excessively inclined to the axis of the housing because it is necessary to pass the rotor axially through the stator and, in this case, it is impossible to pass the shaft of the electric motor through the bearing member until the bearing member has been substantially aligned with the axis of the bearing housing and the remainder of the motor stator. Similarly, when the shaft of the electric motor has been inserted into the bearing member, it is often necessary to manipulate the part-assembled motor before the other end of the motor shaft is located in a second motor bearing. In this case, it is important to limit tilting or swivelling movement of the motor shaft so as to prevent the motor armature mounted on the shaft from fouling the motor stator. This also applies where it is necessary to transport the part-assembled motor before the second motor bearing is fitted.

DISCLOSURE OF THE INVENTION

It is the purpose of the present invention to provide a self-aligning bearing in which the disadvantages of known constructions are at least reduced. It is thus an object of the present invention to provide a self-aligning bearing in which the construction is modified specifically to limit the extent of self-alignment.

According to the invention, this is achieved by ensuring that the outer surface of the bearing member comprises a second external surface-of-revolution, formed around the axis of the bearing member, which is non-coextensive with an imaginary spherical surface having the same center as the first external, part-spherical, surface-of-revolution; and the inner portion of the support ring surrounds the second external surface-of-revolution.

Thus, according to the invention, there is provided a self-aligning bearing in which a bearing member has an inner surface, for receiving a rotatable shaft, and an outer surface comprising a first external, part-spherical, surface-of-revolution formed around the axis of the bearing member and a second external surface-of-revolution, formed around the axis of the bearing member, which is non-coextensive with an imaginary spherical surface having the same centre as the first external, part-spherical, surface-of-revolution; a housing for accommodating the bearing member has a convergent end which defines an internal surface of revolution 8, formed around the axis of the housing 6, and engages the first external, part-spherical, surface-of-revolution to provide the bearing member with both radial and axis support; a retainer is supported within the housing and has resilient means engaging the second external surface-of-revolution so as to urge the first external part-spherical, surface-of-revolution axially into engagement with the convergent end of the housing; and a support ring is supported within the housing and has an inner portion surrounding the second external surface-of-revolution with an annular clearance space between the support ring and the bearing member for limiting radial movement of the bearing member.

As the second external surface-of-revolution is non-coextensive with an imaginary spherical surface having the same center as the first external, part-spherical, surface-of-revolution, tilting or swivelling of the bearing member about an axis perpendicular to the axis of the bearing member, as a result of relative sliding movement between the first external, part-spherical, surface-of-revolution and the convergent end of the housing, causes radial movement of the second external surface-of-revolution. This radial displacement of the second external surface-of-revolution is accommodated by deformation of the resilient retainer means, but the inner portion of the support ring provides an abutment which limits this radial displacement of the second external surface-of-revolution and thus tilting or swivelling movement of the bearing member.

The support ring provided to restrict tilting or swivelling movement of the bearing member relative to the housing, in accordance with the invention, is therefore able to serve the important secondary function of preventing overstraining of the retainers of self-aligning bearings for small electric motors.

The second external surface-of-revolution preferably has a first portion extending inwards from the first external, part-spherical, surface-of-revolution. The retainer can then be mounted adjacent the convergent end of the housing for engagement with this first portion so that, when necessary, an axially short housing can be provided. This is desirable in some cases where space is limited. Where the support ring also holds the retainer in position, the housing need only be long enough to accommodate the retainer and the outer portion of the support ring.

In a preferred embodiment of the invention, the first portion of the second external surface-of-revolution has inner and outer edges and the second external surface-of-revolution has an inner, second portion extending from the inner edge of the first portion. This provides a bearing member having much less volume than a traditional bearing member in which the whole of the outer surface constitutes a single part-spherical surface- of-revolution. This not only saves weight and material, but where the bearing member is of porous, sintered construction, for impregnation with lubricating oil, this oil is much more rapidly available at the inner and outer surfaces of the bearing member. Thus, as the bearing member cools, on cessation of operation, oil is withdrawn into the inner core of the cross-section of the bearing member. When use of the bearing member is recommenced, frictional heat warms the oil which travels by capillary action from the central core of the cross-section of the bearing member to the inner and outer surfaces and, as these inner and outer surfaces are now much closer to the central core, the time taken to provide lubrication at the inner and outer surfaces is reduced.

The second portion of the second external surface-of-revolution is preferably cylindrical in shape. This not only simplifies construction of the bearing member, it also simplifies mounting of the support ring which, in this case, can be disposed at any point along the length of the cylindrical second portion of the second external surface-of-revolution.

According to a further preferred feature of the invention, the support ring has a radially outer portion in fixed engagement with the housing and an axially extending wall surrounding and radially spaced from the second external surface-of-revolution between the radially inner and outer portions of the support ring whereby the radially outer portion is axially offset from the radially inner portion towards the retainer. The resultant increase in the axial distance between the radially inner portion of the support ring and the axis, perpendicular to the axis of the bearing member, about which the bearing member is able to tilt or swivel ensures that this tilting or swivelling movement can be severely restricted even though the radial clearance between the support ring and the second external surface-of-revolution is relatively large.

A further advantage of this form of construction is that a pad of oil absorbent material may be seated between the second portion of the second external surface-of-revolution and the axially extending wall of the support ring. This pad may consist of a single length of felt, of substantially rectangular cross-section, extending 360° around the second external surface-of-revolution. Alternatively, the pad may consist of several turns of felt tape which together provide a substantially rectangular cross-section. Where the bearing member is of porous, sintered construction and is impregnated with lubricating oil, the pad serves to absorb any excess oil released from the bearing member and any oil retained by the pad is available for lubrication on depletion of the oil originally provided within the bearing member. Alternatively, where the bearing member is not impregnated with a supply of lubricating oil, but is porous or provided with oil supply passages, the pad itself can serve as a reservoir for this oil.

In known self-aligning bearings, the retainer normally comprises an annular outer portion, extending inwardly from one end of a short mounting sleeve, and a plurality of resilient fingers projecting radially inwards of the annular outer portion. Retainers such as this serve quite adequately in self-aligning bearings according to the present invention and can be easily clamped in position between an end portion of the housing and the support ring. As an alternative, to simplify construction and to reduce the necessary length of the housing, the mounting sleeve can be omitted. In this case, the outer annular portion of the retainer may be clamped between the end portion of the housing and the support ring.

A totally different type of retainer, of simpler construction, may be provided in the form of a length of elastomeric material which surrounds the second external surface-of-revolution and is held in place by the support ring. This length of elastomeric material may constitute a closed loop or a single length wrapped once around the second external surface-of-revolution and is preferably of circular cross-section. In this case, the part of the length of elastomeric material which abuts the first part of the second external surface-of-revolution constitutes the resilient means which urge the first external, part-spherical, surface-of-revolution axially into engagement with the convergent end of the housing.

As a further variation for a self-aligning bearing in a very small electric motor, regardless of the type of retainer used, the resilient means on one side of the retainer may be stiffer than the resilient means on the other side. As a result, the bearing member is swivelled or tilted until the second external surface of revolution abuts the inner portion of the support ring. Moreover, when the motor shaft is inserted in the bearing member, the difference in the stiffness of the resilient means can be arranged so as to ensure that the axis of the bearing member is inclined to the axis of the motor shaft to thereby reduce the effective clearance between the bearing member and the motor shaft. This reduces noise during operation of the motor.

A prior art construction and five embodiments of the invention are hereinafter described, by way of example with reference to the accompanying drawings.

BRIEF DESCRIPTION OF THE DRAWINGS

FIG. 1 is a sectional side elevation of a known self-aligning bearing for a 0.5 kW PMDC electric motor;

FIG. 2 is a sectional side elevation of a self-aligning bearing according to the invention, for a similar sized PMDC electric motor;

FIGS. 3 and 4 are a sectional side elevation and an end elevation of retainers for use in the self-aligning bearings shown in FIGS. 1 and 2;

FIGS. 5 and 6 are a sectional side elevation and an end elevation of a modified form of the retainer shown in FIGS. 3 and 4;

BEST MODE FOR CARRYING OUT THE INVENTION

Figure 7:
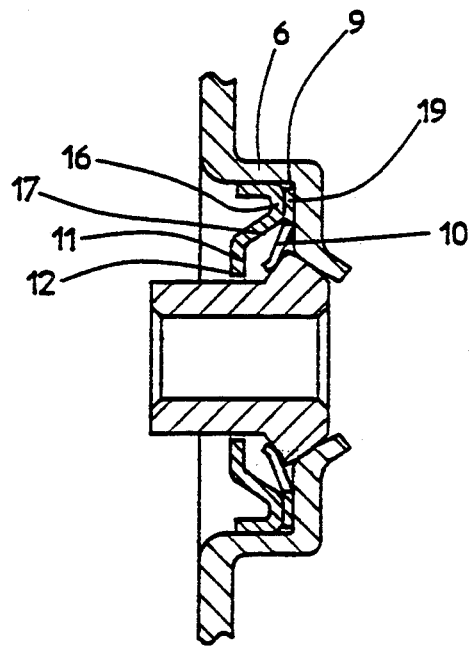
FIGS. 7 to 9 are sectional side elevations of self-aligning bearings according to the invention and incorporating modified retainers as shown in FIGS. 5 and 6.

In the known self-aligning bearing shown in FIG. 1, a bearing member 1 has a cylindrical inner surface 2, for receiving a rotatable shaft (not shown), and an outer surface 3 comprising a part-spherical surface-of-revolution formed around the axis of the bearing member 1. The bearing member 1 is mounted in a housing 6 which has a frusto-conical convergent end 7 engaging the outer surface 3 of the bearing member 1. A retainer 9, shown in detail in FIGS. 3 and 4, has resilient fingers 10 which bear against the opposite sides of the outer surface 3 of the bearing member 1 so as to urge the bearing member 1 axially into engagement with the frusto-conical convergent end 7 of the housing 6. The bearing member 1 is thus capable of substantial tilting or swivelling movement about an axis perpendicular to the axis of the bearing member 1 and this can cause difficulty when inserting the motor shaft within the boating member 1, particularly in an automated assembly process.

This known construction also has the added disadvantage that, although axial movement of the bearing member 1 is constrained to some extent by abutment with the motor shaft, the retainer 9 is too flimsy to prevent combined axial and radial movement of the bearing member 1 under shock loading as, for example, when a motor containing the self-aligning bearing is dropped from a height of one meter. In fact, if the retainer 9 were subjected to shock loading of this nature, it would be permanently distorted to such an extent that it could no longer serve its required function of urging the bearing member 1 axially towards the frusto-conical convergent end 7 of the housing 6. To avoid this form of damage, a support ring 11 is mounted between the frusto-conical convergent end 7 of the housing 6 and the retainer 9. An inner portion 12 of the support ring 11 surrounds the bearing member 1 in such a way that a small annular clearance space 13 is left between the outer surface 3 of the bearing member 1 and the inner portion 12 of the support ring 11. The support ring 11 thereby limits radial and concomitant axial movement of the bearing member 1 so that the resilient fingers 10 of the retainer 9 are never overstrained.

The retainer 9 is made from spring steel and, as shown in FIGS. 3 and 4, has eight resilient fingers 10 projecting radially inwards from an annular outer portion 19 extending from one end of a short mounting sleeve 20. As shown in FIG. 4, individual fingers 10 are separated by slots 21 extending from small apertures 22 formed in the annular outer portion 19 of the retainer 9.

As shown in FIG. 1, the outer portion 19 and the mounting sleeve 20 of the retainer 9 are seated, respectively, against the support ring 11 and the inner surface of the housing 6. Although not shown, means are provided for holding the retainer 9 and the support ring 11 in their correct positions. Thus, the retainer 9 may be attached to the support ring 11 and the support ring 11 may be attached to the housing 6.

In the self-aligning bearing according to the present invention, as shown in FIG. 2, the bearing member 1 is modified in such a way that, in addition to a first external, part-spherical, surface-of-revolution 3, the outer surface of the bearing member 1 has a second external surface-of-revolution about the axis of the bearing member 1 having a frusto-conical first part 4 and a cylindrical second part 5. The frusto-conical first part 4 has inner and outer edges 14 and 15 and the second cylindrical part 5 extends from the inner edge 14 of the frusto-conical first part 4. As in the prior art construction illustrated in FIG. 1, the first external, part-spherical, surface-of-revolution 3 engages a frusto-conical internal surface-of-revolution 8 defined by the convergent end 7 of the bearing housing 6 and, to this extent, the bearing member 1 is again capable of substantial tilting or swivelling movement about axes perpendicular to the axis of the bearing member 1. However, as shown in FIG. 2, the second external surface-of-revolution having the parts 4 and 5 is not coextensive with an imaginary spherical surface having the same center as the first external, part-spherical, surface-of-revolution 3. This ensures that, on tilting or swivelling movement of the bearing member 1, the first and second parts 4 and 5 of the second external surface-of-revolution move radially with respect to such an imaginary spherical surface. As shown, the retainer 9 is seated within the housing 6 adjacent the convergent end 7 so that the resilient fingers 10 bear against the first part 4 of the second external surface-of-revolution between the inner and outer edges 14 and 15.

As shown in FIG. 2, a retainer 9 larger than the retainer 9 shown in FIG. 1 is clamped in place by means of the support ring 11 which has a radially outer mounting sleeve portion 23 in frictional engagement with the inner surface of the housing 6. As shown, the support ring 11 has a radially inner portion 12 surrounding the cylindrical second part 5 of the second external surface-of-revolution 4, 5.

The annular clearance space 13 between the radially inner portion 12 of the support ring 11 and the bearing member 1 not only limits radial and concomitant axial movement of the bearing member 1, as in the case of the known self-aligning bearing shown in FIG. 1, it also limits the extent to which the bearing member 1 is able to rotate about an axis perpendicular to the axis of the bearing member 1 as a result of self-aligning movement between the first external, part-spherical, surface-of-revolution 3 and the frusto-conical internal surface-of-revolution 8 defined by the convergent end 7 of the housing 6.

One secondary advantage of the construction shown in FIG. 2 is that the axial length of the housing 6 may be less than that required in the construction shown in FIG. 1. This is because the retainer 9 is arranged to bear against the bearing member 1 through the first part 4 of the second external surface-of-revolution 4, 5 which is much closer to the frusto-conical convergent end 7 of the housing 6. As shown, the retainer 9 is clamped in position by the support ring 11. However, it would be possible to replace the retainer 9 in FIG. 2 with a smaller retainer 9 having the same dimensions as the retainer 9 shown in FIG. 1. In this case, the retainer 9 would not be clamped between the support ring 11 and the housing 6, but merely supported by the support ring 11 so as to bear against the first part 4 of the second external surface-of-revolution 4, 5. This would facilitate assembly by allowing the retainer 9 to center itself on the first part 4 of the second external surface-of-revolution 4, 5.

Figure 8:
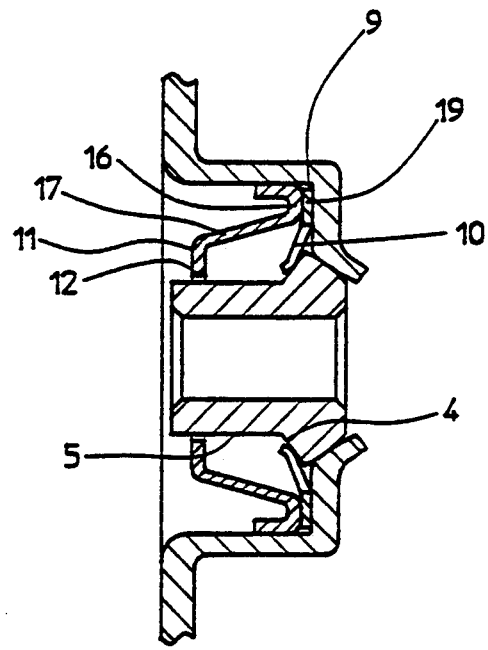
Figure 9:
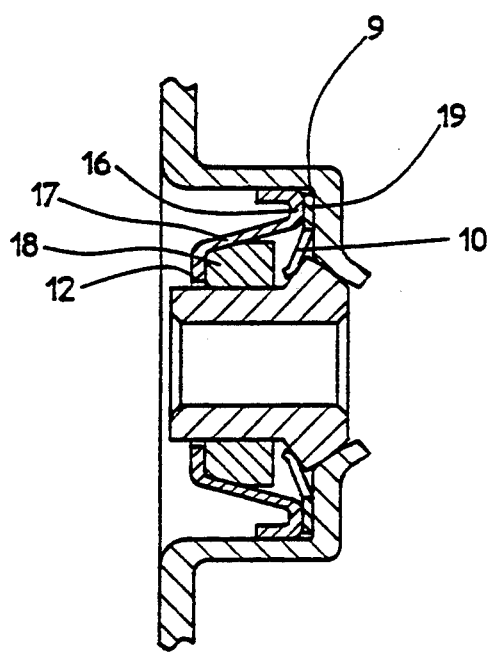

To further reduce the axial length of the housing 6, it is possible to modify the retainer 9, as shown in FIGS. 5 and 6, by omitting the mounting sleeve 20 provided on the conventional retainer shown in FIGS. 3 and 4. In this case, the outer annular portion 19 of the retainer 9 may be clamped between the housing 6, adjacent the frusto-conical convergent end 7, and the support ring 11, as shown in FIG. 7, or merely supported by the support ring 11, as shown in FIGS. 8 and 9. In each of these constructions, the support ring 11 is provided with an axially extending wall 17 which is radially spaced from the second external surface-of-revolution 4, 5 between radially inner and outer portions 12 and 16. As a result, the radially outer portion 16 of the support ring 11 is axially offset from the radially inner portion 12 towards the retainer 9.

In the construction shown in FIG. 7, this offset is quite small and so it is possible to provide a housing 6 of very restricted axial length. However, in the construction illustrated in FIGS. 8 and 9, the axial offset is more substantial. This ensures that the extent of tilting or swivelling movement of the bearing member 1 about an axis perpendicular to an axis of the bearing member 1 can be limited to small angles without relying on very small annular clearance spaces 13, between the inner portion 12 of the support ring 11 and the bearing member 1.

Although this involves some axial increase in the length of the housing 6, the space between the axially extending wall 17 of the support ring 11 and the bearing member 1 can be utilized, as shown in FIG. 9, to hold a felt pad 18. Where the bearing member 1 is of porous, sintered construction and is impregnated with lubricating oil, the pad 18 serves to absorb any excess oil released from the bearing member 1. Alternatively, the pad 18 may be impregnated with lubricating oil to serve as a reservoir.

Assembly is facilitated by first fitting a pad 18 of felt material within the support ring 11 and then passing the cylindrical second part 5 of the second external surface-of-revolution forming part of the outer surface 3 of the bearing member 1 through the retainer 9, the pad 18 and the inner portion 12 of the support ring 11. The felt material may be in the form of closed loop, a single strip extending 360° around the support ring 10, or a number of helically or spirally wound layers.

Figures 11, 12:
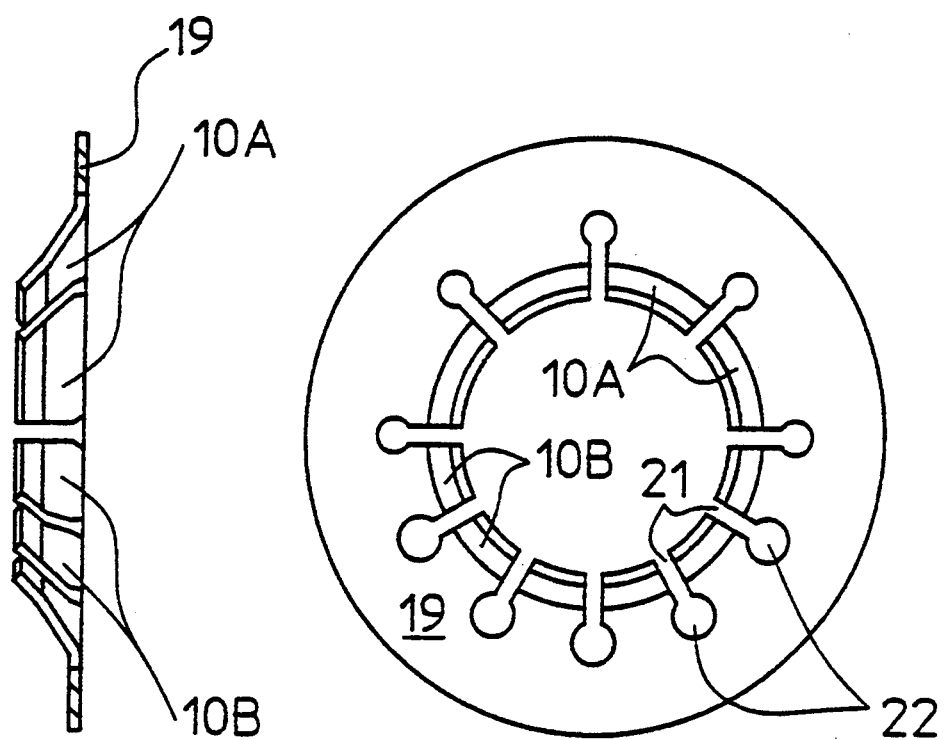
FIGS. 11 and 12 are a sectional side elevation and an end elevation of a modified form of the retainer shown in FIGS. 5 and 6.

The embodiments described with reference to FIGS. 2 and 7 to 9 incorporate retainers 9 as described with reference to FIGS. 3 to 6, in which the resilient fingers 10 all exert the same axial force on the bearing member 1. However, for very small electric motors in which the retainer 9 is clamped between the support ring 11 and the housing 6, as shown in FIGS. 2 and 7, the retainer 9 may be formed, as shown in FIGS. 11 and 12, with the resilient fingers 10A on one side of the retainer 9 formed wider and therefore stiffer than the resilient fingers 10B on the other side of the retainer. In this case, the difference in stiffness causes the bearing member to be swivelled or tilted, in a clockwise direction as shown in FIGS. 2 and 7, until the second part 5 of the second external surface-of-revolution 4, 5 abuts the inner portion 12 of the support ring 11. Moreover, the difference in stiffness can be chosen so that, regardless of the orientation of the motor shaft mounted in the bearing member to the axis of the housing, the axis of the bearing member 1 is always inclined to the axis of the shaft. This reduces the effective clearance between the shaft and the inner surface 2 of the bearing member 1 and results in a much quieter operation of the electric motor.

Although the difference in width and, therefore, stiffness between the fingers 10A and 10B has been achieved by reducing the angular spacing of the slots 21 between the narrower fingers 10B, a similar effect can be achieved with equiangularly spaced slots 21 by either increasing the width or the length of the slots 21 between the less stiff fingers 10B.

Figure 10:
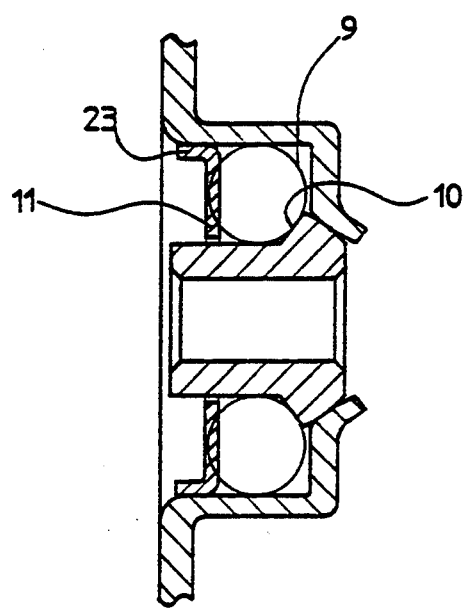
FIG. 10 is a schematic sectional side elevation of a further self-aligning bearing according to the invention and incorporating a different form of retainer.

In the construction shown in FIG. 10, the support ring 11 has an outer support sleeve 23 in frictional engagement with the inner surface of the housing 6. Besides limiting radial and concomitant axial movement of the bearing member 1 and tilting or swivelling movement of the bearing member 1, the support ring 11 also holds a retainer 9, in the form of rubber loop in engagement with the first part 4 of the second external surface-of-revolution 4, 5 so as to urge the first external, part-spherical surface-of-revolution 3 axially into engagement with the frusto-conical internal surface-of-revolution 8 defined by the convergent portion 7 of the housing 6. As shown in FIG. 10, the rubber ring forming the retainer 9 is originally of circular cross-section and so is compacted and deformed when locked in position, even though for the sake of clarity, this has not be shown in FIG. 10. It is clear, however, that the portion of the rubber loop adjacent the first part 4 of the second external surface-of-revolution 4, 5 constitutes resilient means 10 which operate in the same manner as the resilient fingers of the retainer 9 shown in FIGS. 3 to 6.

To provide a difference in the stiffness of the resilient means 10 on opposite sides of a retainer 9 similar to that provided by use of the retainer 9 shown in FIGS. 11 and 12, the rubber ring may be replaced by two half rings of rubber of different compressive stiffness. Alternatively, the cross-section of one half ring may be larger than the cross-section of the other half ring.

The scope of the invention is set out in the appended claims. Although these claims include reference numerals, this is solely for ease of understanding and these reference numerals are not to be regarded as limiting the scope of the claims. The reference numerals should therefore be disregarded in interpreting the scope of the claims.

What is claimed is:

1. A self-aligning bearing comprising:
 a bearing member having an inner surface, for receiving a rotatable shaft, and an outer surface in which a first external, part-spherical, surface-of-revolution, is formed around the axis of the bearing member and a second external surface-of-revolution, which is non-coextensive with any imaginary spherical surface having the same center as the first external, part-spherical, surface-of-revolution, has a first portion which extends transversely of the axis of the bearing member and is formed around the axis of the bearing member;
 a housing for accommodating the bearing member having a convergent end which defines an internal surface-of-revolution, formed around the axis of the housing, and engaging the first external, part-spherical, surface-of-revolution to provide the bearing member with both radial and axial support;
 a retainer having resilient means and supported with the resilient means engaging the bearing member and bearing against the first portion of the second external surface-of-revolution so as to urge the first external, part-spherical, surface-of-revolution axially into engagement with the convergent end of the housing; and
 a support ring supported within the housing and having a radially inner portion surrounding the second external surface-of-revolution with an annular clearance space between the support ring and the bearing member for limiting radial movement of the bearing member.

2. A bearing, according to claim 1, in which the first portion of the second external surface-of-revolution extends radially inwards from the first external, part-spherical, surface-of-revolution.

3. A bearing, according to claim 2, in which the first portion of the second external surface-of-revolution has inner and outer edges and the second external surface-of-revolution has an inner, second portion extending from the inner edge of the first portion.

4. A bearing, according to claim 3, in which the second portion of the second external surface-of-revolution is cylindrical in shape.

5. A bearing, according to claim 4, in which the retainer is a length of elastomeric material which surrounds the second surface-of-revolution.

6. A bearing, according to claim 3, in which the support ring has a radially outer portion supported in fixed relation to the housing and an axially extending wall surrounding and radially spaced from the second external surface-of-revolution between the radially inner and outer portions of the support ring whereby the radially outer portion is axially offset from the radially inner portion towards the retainer.

7. A bearing, according to claim 6, in which a pad of oil absorbent material is seated between the second portion of the second external surface-of-revolution and the axially extending wall of the support ring.

8. A bearing, according to claim 6, in which the retainer is supported in fixed relation to the housing by the support ring.

9. A bearing, according to claim 8, in which the retainer comprises an annular outer portion and the resilient means comprise a plurality of resilient fingers projecting radially inwards from the annular outer portion.

10. A bearing, according to claim 8, in which the resilient means on one side of the retainer are stiffer than the resilient means on the other side.

11. A self-aligning bearing comprising:
 a bearing member having a cylindrical inner surface, for receiving a rotatable shaft, and an outer surface in which a first external, part-spherical surface-of-revolution is formed around the axis of the bearing member and a second external surface-of-revolution, which is non-coextensive with any imaginary spherical surface having the same center as the first external, part-spherical surface-of-revolution, is formed around the axis of the bearing member and has a first portion, with inner and outer edges, which extends radially inwards from the external, part-spherical, surface-of-revolution, and an inner, second cylindrical portion extending from the inner edge of the first portion;
 a housing, for accommodating the bearing member, having a convergent end which defines an internal surface-of-revolution, formed around the axis of the housing, and engaging the first external, part-spherical surface-of-revolution to provide the bearing member with both radial and axial support;
 a retainer supported within the housing and having an annular portion and a plurality of resilient fingers which are stiffer on one side of the retainer than on the other and project radially inwards, from the annular portion, to engage the bearing member and bear against the first portion of the second external surface-of-revolution so as to urge the first external, part-spherical surface-of-revolution axially into engagement with the convergent end of the housing;
 a support ring, disposed within the housing, having a radially inner portion surrounding the second external surface-of-revolution with an annular clearance space between the support ring and the bearing member for limiting radial movement of the bearing member, a radially outer portion supported in fixed relation to the housing, and an axially extending wall surrounding and radially spaced from the second external surface-of-revolution between the radially inner and outer portions of the support ring whereby the radially outer portion is axially offset from the radially inner portion towards the retainer; and
 a pad of oil absorbent material is seated between the second portion of the second external surface-of-revolution and the axially extending wall of the support ring.

* * * * *